(12) United States Patent
Marino

(10) Patent No.: US 11,140,481 B2
(45) Date of Patent: Oct. 5, 2021

(54) WIRELESS SPEAKER ASSEMBLY

(71) Applicant: Phil Marino, Berlin, CT (US)

(72) Inventor: Phil Marino, Berlin, CT (US)

(*) Notice: Subject to any disclaimer, the term of this patent is extended or adjusted under 35 U.S.C. 154(b) by 403 days.

(21) Appl. No.: 16/218,560

(22) Filed: Dec. 13, 2018

(65) Prior Publication Data

US 2020/0196057 A1  Jun. 18, 2020

(51) Int. Cl.
*H04R 5/02* (2006.01)
*H04R 1/02* (2006.01)
*H02J 7/34* (2006.01)

(52) U.S. Cl.
CPC ............ *H04R 5/02* (2013.01); *H02J 7/342* (2020.01); *H04R 1/026* (2013.01); *H04R 2420/07* (2013.01); *H04R 2420/09* (2013.01)

(58) Field of Classification Search
CPC ...... H04R 5/02; H04R 1/026; H04R 2420/07; H04R 2420/09; H02J 7/342; H02J 7/00; G06F 1/1632; G06F 13/4081; G06F 1/26; G06F 1/266
See application file for complete search history.

(56) References Cited

U.S. PATENT DOCUMENTS

| | | | |
|---|---|---|---|
| 8,094,860 B2 | 1/2012 | Huang | |
| 8,446,126 B2 | 5/2013 | Cheng | |
| D753,093 S | 4/2016 | Garfio | |
| 9,535,458 B2* | 1/2017 | Oakley | G06F 1/1633 |
| 9,609,435 B2* | 3/2017 | Osborn | H04R 1/2834 |
| 2006/0153413 A1* | 7/2006 | Nakajima | H04R 1/021 |
| | | | 381/345 |
| 2015/0340824 A1* | 11/2015 | Leiba | H01R 13/20 |
| | | | 439/668 |
| 2019/0086957 A1* | 3/2019 | Fleisig | G06F 13/4081 |
| 2020/0303931 A9* | 9/2020 | Clark | H02J 7/0045 |

* cited by examiner

*Primary Examiner* — Andrew L Sniezek

(57) ABSTRACT

A wireless speaker assembly for broadcasting audio and charging an electronic device includes a housing that defines an interior space. A first battery, a microprocessor, and a transceiver are coupled to the housing and are positioned in the interior space. The microprocessor is operationally coupled to the first battery and the transceiver. A speaker and a plurality of connectors are coupled to the housing and are operationally coupled to the microprocessor. The transceiver is configured to receive an audio signal from the electronic device, positioning the microprocessor to command the speaker to broadcast the audio signal. A respective connector is configured to couple to a charging cord of the electronic device to charge a second battery that is positioned in the electronic device.

18 Claims, 4 Drawing Sheets

WIRELESS SPEAKER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to speaker assemblies and more particularly pertains to a new speaker assembly for broadcasting audio and charging an electronic device.

BRIEF SUMMARY OF THE INVENTION

An embodiment of the disclosure meets the needs presented above by generally comprising a housing that defines an interior space. A first battery, a microprocessor, and a transceiver are coupled to the housing and are positioned in the interior space. The microprocessor is operationally coupled to the first battery and the transceiver. A speaker and a plurality of connectors are coupled to the housing and are operationally coupled to the microprocessor. The transceiver is configured to receive an audio signal from an electronic device, positioning the microprocessor to command the speaker to broadcast the audio signal. A respective connector is configured to couple to a charging cord of the electronic device to charge a second battery that is positioned in the electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
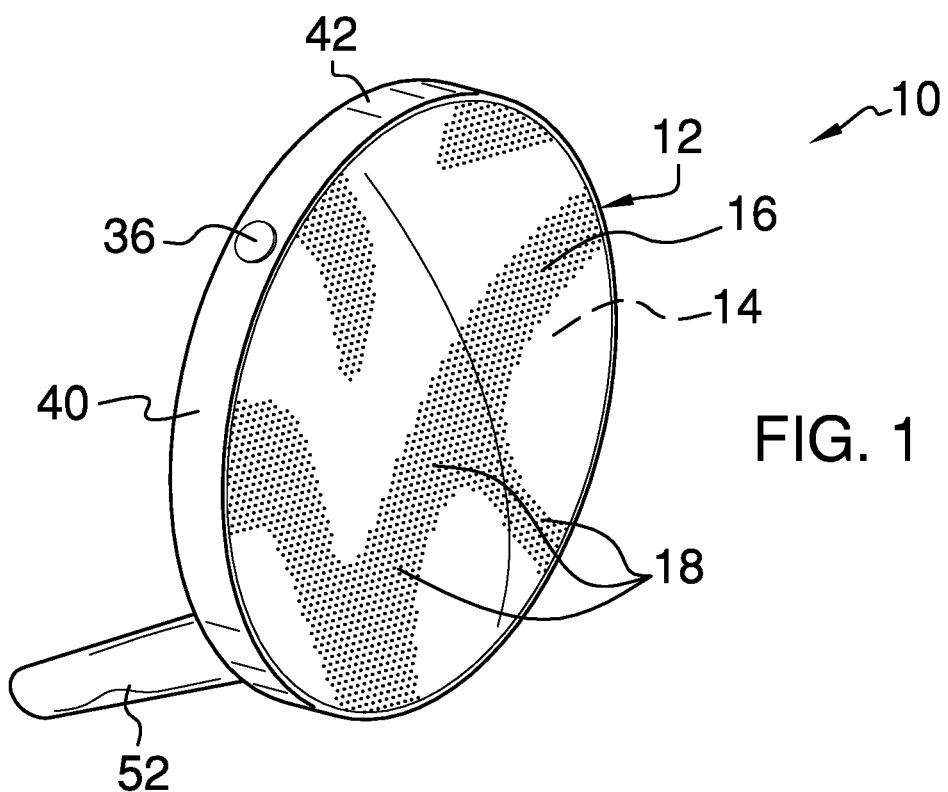
FIG. 1 is an isometric perspective view of a wireless speaker assembly according to an embodiment of the disclosure.

With reference now to the drawings, and in particular to FIGS. 1 through 6 thereof, a new speaker assembly embodying the principles and concepts of an embodiment of the disclosure and generally designated by the reference numeral 10 will be described.

Figure 2:
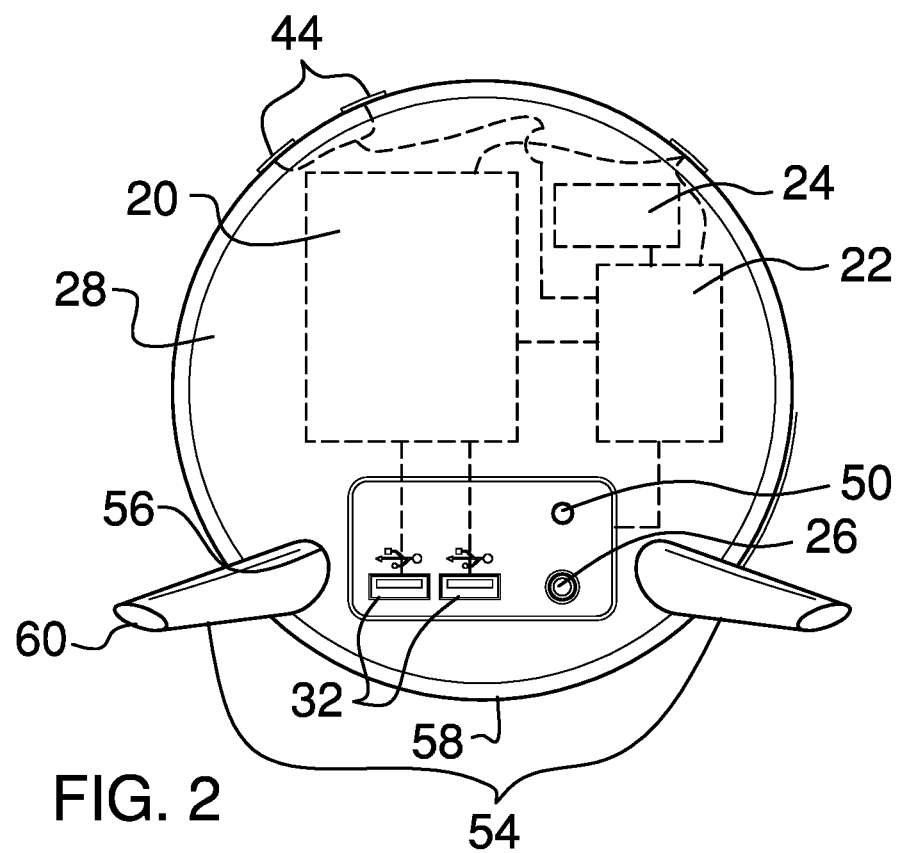
FIG. 2 is a back view of an embodiment of the disclosure.
Figure 3:
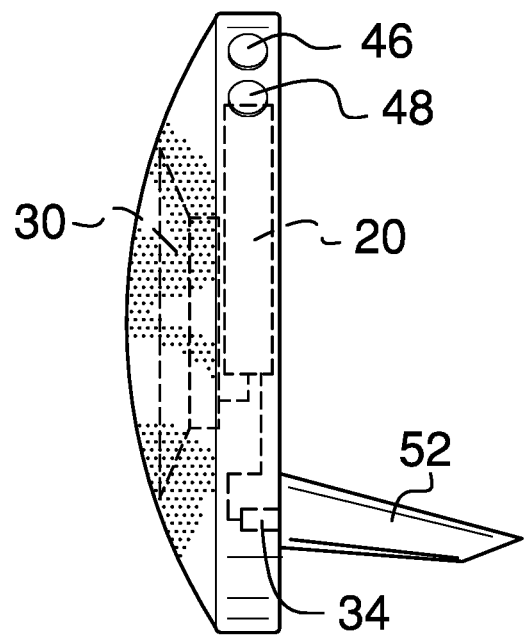
FIG. 3 is a side view of an embodiment of the disclosure.
Figure 4:
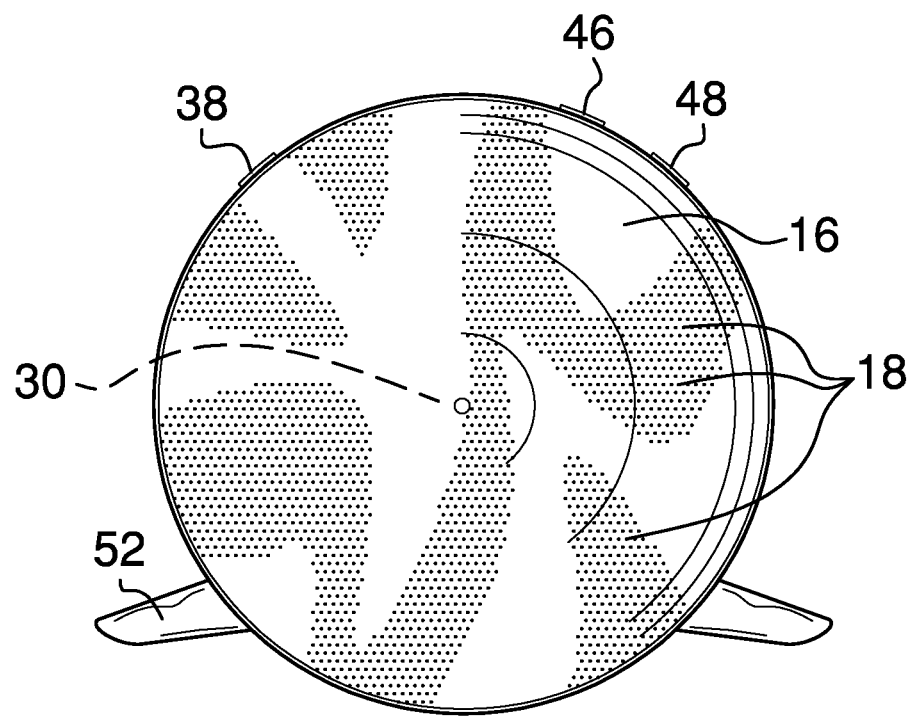
FIG. 4 is a front view of an embodiment of the disclosure.

As best illustrated in FIGS. 1 through 6, the wireless speaker assembly 10 generally comprises a housing 12 that defines an interior space 14. The housing 12 is substantially disc-shaped. The housing 12 has a front 16 that is domed. A plurality of apertures 18 is positioned in the front 16 of the housing 12, as shown in FIG. 4.

A first battery 20, a microprocessor 22, and a transceiver 24 are coupled to the housing 12 and are positioned in the interior space 14, as shown in FIG. 3. The microprocessor 22 is operationally coupled to the first battery 20 and the transceiver 24.

Figure 6:
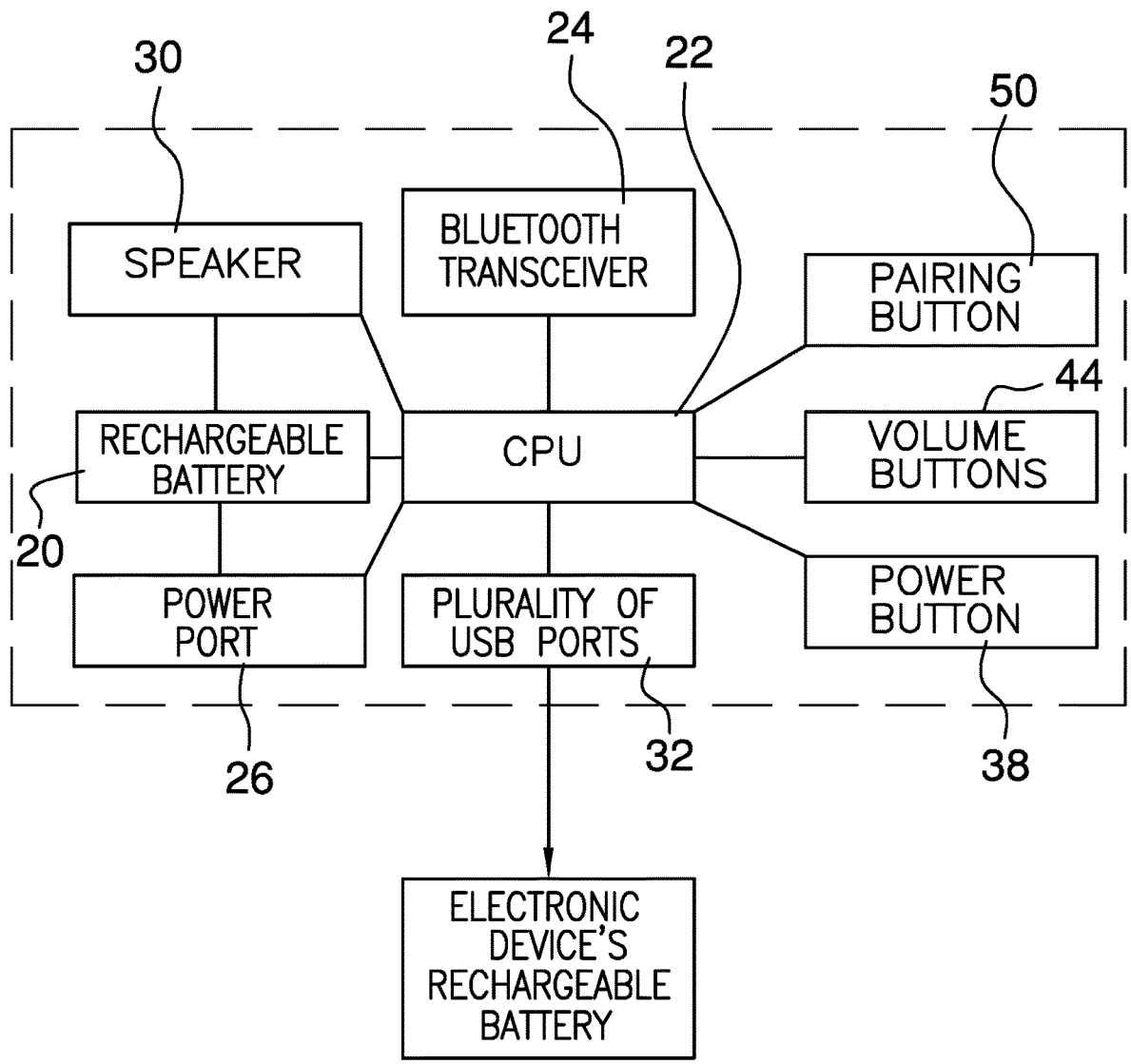
FIG. 6 is a block diagram of an embodiment of the disclosure.

The first battery 20 is rechargeable. A port 26 is coupled to a back 28 of the housing 12 and is operationally coupled to the microprocessor 22 and the first battery 20, as shown in FIG. 6. The port 26 is configured to couple to a power cable to charge the first battery 20. The port 26 is barrel-receptacle type and configured to insert a barrel plug of the power cable.

A speaker 30 and a plurality of connectors 32 are coupled to the housing 12 and are operationally coupled to the microprocessor 22. The transceiver 24 is configured to receive an audio signal from an electronic device, positioning the microprocessor 22 to command the speaker 30 to broadcast the audio signal. A respective connector 32 is configured to couple to a charging cord of the electronic device to charge a second battery that is positioned in the electronic device.

The plurality of connectors 32 comprises two connectors 32. The plurality of connectors 32 is positioned on the back 28 of the housing 12. Each connector 32 comprises a Universal Serial Bus port 34, as shown in FIG. 2. The speaker 30 is positioned in the interior space 14 proximate to the front 16 of the housing 12, as shown in FIG. 3, so that the speaker 30 is positioned to broadcast the audio signal through the apertures 18.

A power controller 36 is coupled to the housing 12 and is operationally coupled to the microprocessor 22. The power controller 36 is positioned to selectively signal the microprocessor 22 to power the speaker 30 and the transceiver 24. The power controller 36 comprises a power button 38 that is depressible. The power button 38 is configured to be depressed a first time to signal the microprocessor 22 to power the speaker 30 and the transceiver 24. The power button 38 is configured to be depressed a second time to signal the microprocessor 22 to depower the speaker 30 and the transceiver 24. The power controller 36 is positioned on a side 40 of the housing 12 proximate to a top 42 of the housing 12, as shown in FIG. 1.

A volume controller 44 is coupled to the housing 12 and is operationally coupled to the microprocessor 22. The volume controller 44 is positioned to selectively signal the microprocessor 22 to set a volume of the speaker 30. The volume controller 44 comprises an increase button 46 and a decrease button 48, which are depressible. The increase button 46 is configured to be depressed to signal the microprocessor 22 to increase the volume of the speaker 30. The decrease button 48 is configured to be depressed to signal the microprocessor 22 to decrease the volume of the speaker 30. The volume controller 44 is positioned on the side 40 of the housing 12 proximate to the top 42 of the housing 12, as shown in FIG. 3.

A pairing button 50 is coupled to the housing 12 and is operationally coupled to the microprocessor 22. The pairing button 50 is depressible. The pairing button 50 is configured to be depressed to signal the microprocessor 22 to actuate the transceiver 24 to wirelessly connect to a transmitter of the electronic device. The pairing button 50 is positioned on the back 28 of the housing 12, as shown in FIG. 2.

A stand 52 is coupled to the back 28 of the housing 12, as shown in FIG. 2. The stand 52 is configured to abut a substantially horizontal surface to position the front 16 of the housing 12 transverse to the substantially horizontal surface so that the speaker 30 is positioned to broadcast the audio signal.

Figure 5:
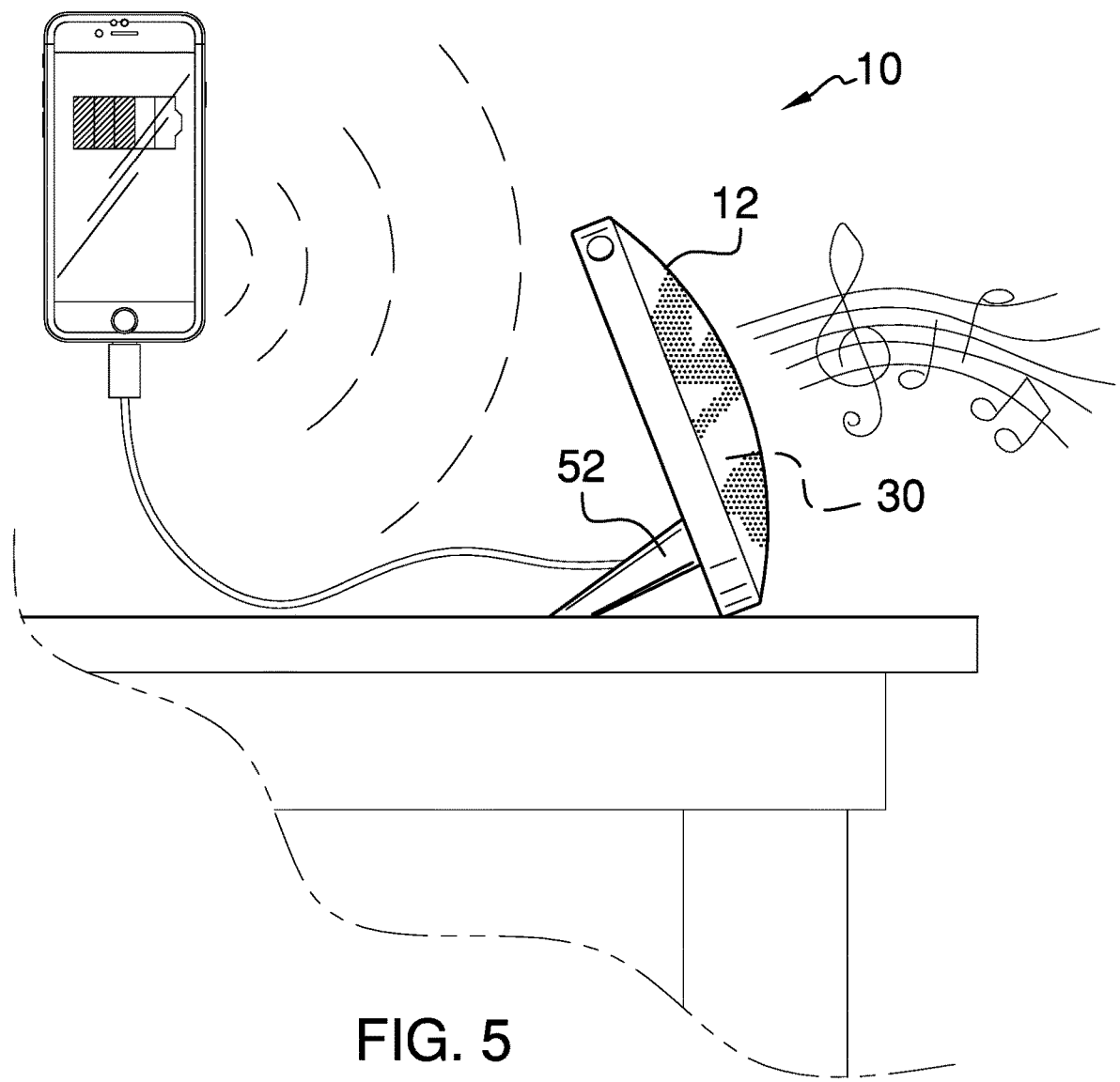
FIG. 5 is an in-use view of an embodiment of the disclosure.

The stand 52 comprises a pair of rods 54. Each rod 54 has a first end 56 that is coupled to the back 28 of the housing 12 proximate to a bottom 58 of the housing 12 so that a second end 60 of the rod 54 is positioned distal from the housing 12. The rod 54 extends substantially perpendicularly from the back 28 of the housing 12. The second end 60 is tapered so that the second end 60 is configured to be positioned flush to the substantially horizontal surface, as shown in FIG. 5.

In use, the power button 38 is depressed to signal the microprocessor 22 to power the speaker 30 and the transceiver 24. The pairing button 50 is depressed to signal the microprocessor 22 to actuate the transceiver 24 to wirelessly connect to the transmitter of the electronic device, positioning a user to send an audio file for broadcast by the speaker 30. If required, the user can connect the charging cord of the electronic device to the respective connector 32 to charge the second battery that is positioned in the electronic device.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wireless speaker assembly comprising:
    a housing defining an interior space, the housing being substantially disc-shaped, the housing having a front, the front being domed, a plurality of apertures positioned in the front of the housing;
    a first battery coupled to the housing and positioned in the interior space;
    a microprocessor coupled to the housing and positioned in the interior space, the microprocessor being operationally coupled to the first battery;
    a plurality of connectors coupled to the housing, the connectors being operationally coupled to the microprocessor wherein a respective connector is configured for coupling to a charging cord of an electronic device for charging a second battery positioned in the electronic device;
    a speaker coupled to the housing, the speaker being operationally coupled to the microprocessor, the speaker being positioned in the interior space proximate to the front of the housing and entirely within a portion of the interior space enclosed by the domed front of the housing; and
    a transceiver coupled to the housing and positioned in the interior space, the transceiver being operationally coupled to the microprocessor wherein the transceiver is configured for receiving an audio signal from the electronic device positioning the microprocessor for commanding the speaker for broadcasting the audio signal.

2. The assembly of claim 1, further comprising:
    the first battery being rechargeable; and
    a port coupled to the housing, the port being operationally coupled to the microprocessor and the first battery wherein the port is configured for coupling to a power cable for charging the first battery.

3. The assembly of claim 2, further including the port being barrel-receptacle type wherein the port is configured for inserting a barrel plug of the power cable.

4. The assembly of claim 2, further including the port being positioned on a back of the housing.

5. The assembly of claim 1, further including the plurality of connectors comprising two connectors.

6. The assembly of claim 1, further including the plurality of connectors being positioned on a back of the housing.

7. The assembly of claim 1, further including each connector comprising a Universal Serial Bus port.

8. The assembly of claim 1, further including a power controller coupled to the housing, the power controller being operationally coupled to the microprocessor wherein the power controller is positioned for selectively signaling the microprocessor for powering the speaker and the transceiver.

9. The assembly of claim 8, further including the power controller comprising a power button, the power button being depressible wherein the power button is configured for depressing a first time for signaling the microprocessor for powering the speaker and the transceiver and wherein the power button is configured for depressing a second time for signaling the microprocessor for depowering the speaker and the transceiver.

10. The assembly of claim 8, further including the power controller being positioned on a side of the housing proximate to a top of the housing.

11. The assembly of claim 1, further including a volume controller coupled to the housing, the volume controller being operationally coupled to the microprocessor wherein the volume controller is positioned for selectively signaling the microprocessor for setting a volume of the speaker.

12. The assembly of claim 11, further including the volume controller comprising an increase button and a decrease button, the increase button and the decrease button being depressible wherein the increase button is configured for depressing for signaling the microprocessor for increasing the volume of the speaker and wherein the decrease button is configured for depressing for signaling the microprocessor tor decreasing the volume of the speaker.

13. The assembly of claim 11, further including the volume controller being positioned on a side of the housing proximate to a top of the housing.

14. The assembly of claim 1, further including a pairing button coupled to the housing, the pairing button being operationally coupled to the microprocessor, the pairing button being depressible wherein the pairing button is configured for depressing for signaling the microprocessor for actuating the transceiver for wirelessly connecting to a transmitter of the electronic device.

15. The assembly of claim 14, further including the pairing button being positioned on a back of the housing.

16. The assembly of claim 1, further including a stand coupled to a back of the housing wherein the stand is configured for abutting a substantially horizontal surface for positioning the front of the housing transverse to the substantially horizontal surface such that the speaker is positioned for broadcasting the audio signal.

17. The assembly of claim 16, further including the stand comprising a pair of rods, each rod having a first end coupled to the back of the housing proximate to a bottom of the housing such that a second end of the rod is positioned distal from the housing and such that the rod extends substantially perpendicularly from the back of the housing, the second end being tapered such that the second end is configured for positioning flush to the substantially horizontal surface.

18. A wireless speaker assembly comprising:
  a housing defining an interior space, the housing being substantially disc-shaped, the housing having a front, the front being domed;
  a plurality of apertures positioned in the front of the housing;
  a first battery coupled to the housing and positioned in the interior space, the first battery being rechargeable;
  a microprocessor coupled to the housing and positioned in the interior space, the microprocessor being operationally coupled to the first battery;
  a port coupled to the housing, the port being operationally coupled to the microprocessor and the first battery wherein the port is configured for coupling to a power cable for charging the first battery, the port being barrel-receptacle type wherein the port is configured for inserting a barrel plug of the power cable, the port being positioned on a hack of the housing;
  a plurality of connectors coupled to the housing, the connectors being operationally coupled to the microprocessor wherein a respective connector is configured for coupling to a charging cord of an electronic device for charging a second battery positioned in the electronic device, the plurality of connectors comprising two connectors, the plurality of connectors being positioned on the hack of the housing, each connector comprising a Universal Serial Bus port;
  a speaker coupled to the housing, the speaker being operationally coupled to the microprocessor, the speaker being positioned in the interior space proximate to the front of the housing and entirely within a portion of the interior space enclosed by the domed front of the housing;
  a transceiver coupled to the housing and positioned in the interior space, the transceiver being operationally coupled to the microprocessor wherein the transceiver is configured for receiving an audio signal from the electronic device positioning the microprocessor for commanding the speaker for broadcasting the audio signal;
  a power controller coupled to the housing, the power controller being operationally coupled to the microprocessor wherein the power controller is positioned for selectively signaling the microprocessor for powering the speaker and the transceiver, the power controller comprising a power button, the power button being depressible wherein the power button is configured for depressing a first time for signaling the microprocessor for powering the speaker and the transceiver and wherein the power button is configured for depressing a second time for signaling the microprocessor for depowering the speaker and the transceiver, the power controller being positioned on a side of the housing proximate to a top of the housing;
  a volume controller coupled to the housing, the volume controller being operationally coupled to the microprocessor wherein the volume controller is positioned for selectively signaling the microprocessor for setting a volume of the speaker, the volume controller comprising an increase button and a decrease button, the increase button and the decrease button being depressible wherein the increase button is configured for depressing for signaling the microprocessor for increasing the volume of the speaker and wherein the decrease button is configured for depressing for signaling the microprocessor for decreasing the volume of the speaker, the volume controller being positioned on the side of the housing proximate to the top of the housing;
  a pairing button coupled to the housing, the pairing button being operationally coupled to the microprocessor, the pairing button being depressible wherein the pairing button is configured for depressing for signaling the microprocessor for actuating the transceiver for wirelessly connecting to a transmitter of the electronic device, the pairing button being positioned on the back of the housing; and
  a stand coupled to the back of the housing wherein the stand is configured for abutting a substantially horizontal surface for positioning the front of the housing transverse to the substantially horizontal surface such that the speaker is positioned for broadcasting the audio signal, the stand comprising a pair of rods, each rod having a first end coupled to the back of the housing proximate to a bottom of the housing such that a second end of the rod is positioned distal from the housing and such that the rod extends substantially perpendicularly from the back of the housing, the second end being tapered such that the second end is configured for positioning flush to the substantially horizontal surface.

\* \* \* \* \*